US012811400B2

(12) United States Patent
Hasler et al.

(10) Patent No.: US 12,811,400 B2
(45) Date of Patent: Nov. 24, 2026

(54) APPARATUS AND METHOD FOR SUPPLYING POWER TO OR ABSORBING POWER FROM A LOAD

(71) Applicant: Hitachi Energy Ltd, Zürich (CH)

(72) Inventors: Jean-Philippe Hasler, Västerås (SE); Jon Rasmussen, Västra Frölunda (SE)

(73) Assignee: HITACHI ENERGY LTD, Zurich (CH)

( * ) Notice: Subject to any disclaimer, the term of this patent is extended or adjusted under 35 U.S.C. 154(b) by 149 days.

(21) Appl. No.: 18/876,147

(22) PCT Filed: Jun. 29, 2022

(86) PCT No.: PCT/EP2022/067928
§ 371 (c)(1),
(2) Date: Dec. 17, 2024

(87) PCT Pub. No.: WO2024/002478
PCT Pub. Date: Jan. 4, 2024

(65) Prior Publication Data
US 2025/0233416 A1 Jul. 17, 2025

(51) Int. Cl.
*H02J 3/00* (2026.01)
*H02J 3/16* (2006.01)
*H02J 13/12* (2026.01)

(52) U.S. Cl.
CPC ................ *H02J 3/16* (2013.01); *H02J 13/12* (2026.01); *H02J 3/002* (2020.01)

(58) Field of Classification Search
CPC ..... G05F 1/00; G05F 1/10; G05F 1/12; G05F 1/46; G05F 1/455; G05F 1/45;
(Continued)

(56) References Cited

U.S. PATENT DOCUMENTS

2022/0321041 A1* 10/2022 Ebrahimzadehveshareh ............... H02J 3/381
2024/0429841 A1* 12/2024 Yang ......................... H02J 3/38
(Continued)

FOREIGN PATENT DOCUMENTS

JP H11155236 A 6/1999
JP 2001008367 A 1/2001
(Continued)

OTHER PUBLICATIONS

A.S.Vijay et al., "An Adaptive Virtual Impedance Control for Improving Power Sharing Among Inverters in Islanded AC Microgrids", IEEE Transactions on Smart Grid, vol. 12, No. 4, Jul. 2021, p. 2991-3003.
(Continued)

*Primary Examiner* — Crystal L Hammond
*Assistant Examiner* — Nusrat Quddus
(74) *Attorney, Agent, or Firm* — PROCOPIO, CORY, HARGREAVES & SAVITCH LLP

(57) ABSTRACT

An apparatus is configured to supply power to a load or absorb power from the load, the load being connected or connectable to a load conductor. The apparatus comprises a power supplying and/or absorbing device, configured for selectively supplying power to the load conductor or absorbing power from the load conductor, and a control unit configured to control the power supplying and/or absorbing device. The control unit is configured to determine, based on at least one value indicative of voltage of the load conductor and a virtual impedance of the power supplying and/or absorbing device, a voltage reference value for the power supplying and/or absorbing device, and control the power supplying and/or absorbing device to supply power to the load conductor, and thereby supply power to the load, or absorb power from the load conductor, and thereby absorb
(Continued)

power from the load, based on the determined voltage reference value.

13 Claims, 2 Drawing Sheets

(58) Field of Classification Search

CPC ... G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/158; H02M 3/1588; H02M 2003/1566; H02M 3/1582; H02M 2003/1557; H02M 5/40; H02M 5/42; H02M 5/453; H02M 7/7575; H02M 5/458; H02M 5/45; H02M 5/4585; H02M 5/4505; H02M 5/451; H02M 5/452; H02M 5/447; H02M 5/456; H02M 1/12; H02M 1/4266; H02M 2001/123; H02M 3/073; H02M 3/137; H02M 3/28; H02M 3/315; H02M 3/3155; H02M 3/325; H02M 3/335; H02M 7/10; H02M 7/515; H02M 7/521; H02M 7/53; H02M 7/537; H02M 7/5383; H02M 7/538466; H02M 7/53862; H02M 7/5387; H02M 7/53871; H02M 7/53875; H02M 7/757; H02M 7/79; H02M 3/337; H02M 3/338; H02M 3/3382; H02M 3/3384; H02M 7/538; H02M 7/53806; H02M 7/53832; H02M 7/53835; H02M 7/487; H02M 7/539; H02M 7/23; H02M 7/217; H02M 7/21; H02M 7/04; H02M 7/00; H05B 39/048; B23K 11/24; H04B 2215/069; H02H 7/261; H02H 7/268; H02J 3/36; H02J 3/01

See application file for complete search history.

(56) References Cited

U.S. PATENT DOCUMENTS

| | | | | |
|---|---|---|---|---|
| 2025/0062709 | A1* | 2/2025 | Lund | F03D 7/0284 |
| 2025/0202236 | A1* | 6/2025 | Hasler | H02J 3/14 |
| 2025/0233416 | A1* | 7/2025 | Hasler | H02J 13/12 |
| 2025/0309753 | A1* | 10/2025 | Yi | H02J 3/381 |
| 2026/0018898 | A1* | 1/2026 | Laha | H02J 3/38 |

FOREIGN PATENT DOCUMENTS

| | | | |
|---|---|---|---|
| JP | 2013031362 | A | 2/2013 |
| WO | 98/27476 | A1 | 6/1998 |

OTHER PUBLICATIONS

Haiya Qian et al., "Analysis and Implementation of Virtual Impedance for Fixed-Frequency Control Strategy in Microgrid", Mar. 9, 2021, Wiley, IET Generation, Transmission & Distribution, 15, DOI: 10.1049/grd2.12176, 2262-2276.

Seyed Mohammad Sadegh Hosseinimoghadam et al., "Power-Sharing Control in an Islanded Microgrid using Virtual Impedance", 8th IEEE International Conference on Smart Grid, Jun. 17-19, 2020, Paris, France , icSmartGrid 2020, p. 73-77.

Xiongfei Wang et al., "Virtual-Impedance-Based Control for Voltage-Source and Current-Source Converters", IEEE Transactions on Power Electronics, vol. 30, No. 12, Dec. 2015, p. 7019-7037.

* cited by examiner

APPARATUS AND METHOD FOR SUPPLYING POWER TO OR ABSORBING POWER FROM A LOAD

CROSS-REFERENCE TO RELATED APPLICATIONS

The present application is a national stage entry of International Patent Application No. PCT/EP2022/067928, filed on Jun. 29, 2022, which is hereby incorporated herein by reference as if set forth in full.

TECHNICAL FIELD

The present invention relates to an apparatus configured to supply power to a load that is connected with a power system or absorb power from the load.

BACKGROUND

A power system, such as a power transmission and/or distribution system and/or a power grid, may be used to provide power to equipment in many industries. In this context, the power system may be referred to as a feeding electrical network or system, and the equipment may be referred to as a load. At least in some industries, flicker in the voltage of the power system—i.e., rapid fluctuations in the voltage of the power system—and generation of harmonic frequencies by the load in the voltage of the power system may be a concern. For example, in many electrical arc furnace (EAF) steel-making facilities, flicker and generation of harmonic frequencies in the voltage of the feeding electrical network, or "harmonics", are a concern for the feeding electrical network. The flicker can be reduced by measuring the EAF current and compensating for harmonic frequencies in the voltage of the feeding electrical network and negative sequence currents using a device such as a Static Synchronous Compensator (STATCOM). To further improve compensation for harmonic frequencies in the voltage of the feeding electrical network it may be focused on compensating for the low-order harmonics mostly generated by the EAF.

SUMMARY

A device such as a Static Synchronous Compensator (STATCOM) can be used to provide or absorb reactive power and thereby regulate the voltage at the point of connection to the power system or feeding electrical network. For example, for a STATCOM used in an electrical arc furnace (EAF) application, two control methods may operate concurrently. One control method may be so-called flicker control, which may work as an open-loop control, and which may counteract any rapid changes in the load (e.g., EAF) current. The flicker control may compensate for reactive power, negative sequence current of the load and possibly some low-order harmonics in the voltage of the power system or feeding electrical network. Another control method may be power factor control, which may work as a closed-loop control and which may compensate the power factor to the connecting power system or feeding electrical network. The power factor control may be based on sensed (or measured) or calculated current of the power system or feeding electrical network, which may give the active and reactive power at the point of connection to the power system or feeding electrical network.

A flicker control algorithm may aim at correcting the negative sequence current of the load, which may produce flicker in the load current. Harmonics compensation for the low-order harmonics (e.g., below $5^{th}$ order harmonics) may however be very limited. To improve the low-order harmonics compensation, other control algorithms may be used. However, such other control algorithms may require that the device, which is used to provide or absorb reactive power and thereby regulate the voltage at the point of connection to the power system or feeding electrical network (e.g., a STATCOM or a Voltage Source Converter (VSC) based device) is relatively large, due to that a relatively large number of converter cells may be needed in order for such control algorithms to be able to compensate for the low-order harmonics. An example of such other control algorithms is provided in WO 98/27476 A1. However, increasing the size of device by increasing the number of converter cells will in general increase the cost of the device—and thereby also the cost of the overall system.

In view of the foregoing, a concern of the present invention is to provide means for compensating for any low-order harmonics generated by a load such as an EAF in the voltage of an electrical network or power system feeding the load, while reducing or even avoiding the need for increasing a size of a device used to provide or absorb reactive power and thereby regulate the voltage at the point of connection to the power system or feeding electrical network.

To address at least one of this concern and other concerns, an apparatus and a method in accordance with the independent claims are provided. Preferred embodiments are defined by the dependent claims.

According to a first aspect of the present invention, an apparatus is provided. The apparatus is configured to supply power to a load, which is connected with a power system, or absorb power from the load. The load is connected or connectable to a load conductor. The power system may be connected or connectable to the load conductor. The apparatus comprises a power supplying and/or absorbing device. The power supplying and/or absorbing device is connected to the load conductor. The power supplying and/or absorbing device is configured for selectively supplying power to the load conductor or absorbing power from the load conductor. The power supplied to the load conductor or absorbed from the load conductor by the power supplying and/or absorbing device is governed at least by a voltage reference value of the power supplying and/or absorbing device. The apparatus comprises a control unit, which is configured to control the power supplying and/or absorbing device, e.g., to control operation of the power supplying and/or absorbing device. The control unit is configured to obtain at least one value indicative of voltage of the load conductor. The control unit is configured to determine, based on the at least one value indicative of voltage of the load conductor and a virtual impedance of the power supplying and/or absorbing device, a voltage reference value for the power supplying and/or absorbing device. The control unit is configured to control the power supplying and/or absorbing device to supply power to the load conductor, and thereby supply power to the load, or absorb power from the load conductor, and thereby absorb power from the load, based on the determined voltage reference value. The virtual impedance of the power supplying and/or absorbing device is associated with a virtual reactance and a virtual resistance. The power supplying and/or absorbing device is configured such that a value of the virtual reactance is higher than the value of a reactance of the power supplying and/or absorbing device, and such that a value of the virtual resistance is less than the value of the virtual reactance.

According to a second aspect of the present invention, a method, implemented in an apparatus configured to supply power to a load connected with a power system or absorb power from the load, is provided. The load is connected or connectable to a load conductor. The power system may be connected or connectable to the load conductor. The apparatus comprises a power supplying and/or absorbing device. The power supplying and/or absorbing device is connected to the load conductor. The power supplying and/or absorbing device is configured for selectively supplying power to the load conductor or absorbing power from the load conductor. The power supplied to the load conductor or absorbed from the load conductor by the power supplying and/or absorbing device is governed at least by a voltage reference value of the power supplying and/or absorbing device. The method comprises obtaining at least one value indicative of voltage of the load conductor. The method comprises determining, based on the at least one value indicative of voltage of the load conductor and a virtual impedance of the power supplying and/or absorbing device, a voltage reference value for the power supplying and/or absorbing device. The method comprises controlling the power supplying and/or absorbing device to supply power to the load conductor, and thereby supply power to the load, or absorb power from the load conductor, and thereby absorb power from the load, based on the determined voltage reference value. The virtual impedance of the power supplying and/or absorbing device is associated with a virtual reactance and a virtual resistance, wherein the power supplying and/or absorbing device is configured such that a value of the virtual reactance is higher than the value of a reactance of the power supplying and/or absorbing device, and such that a value of the virtual resistance is less than the value of the virtual reactance.

According to one or more embodiments of the present invention, the power supplying and/or absorbing device, which may be directly connected to the load conductor, can be considered to use grid forming control to appear as a voltage source behind a virtual impedance. The virtual impedance of the power supplying and/or absorbing device can used as described in the foregoing for controlling the power supplying and/or absorbing device to supply power to the load conductor, and thereby supply power to the load, or absorb power from the load conductor, and thereby absorb power from the load. This may be done in order compensate for any disturbances or voltage variations in the voltage of the load conductor or the power system connected to the load, and reduce or avoid any harmonics, e.g., low-order harmonics such as below $5^{th}$ order, which may be generated by the load in the voltage of the power system. When the power supplying and/or absorbing device acts as a certain impedance on the load conductor, any changes in voltage of the load conductor may also make the power supplying and/or absorbing device provide a corresponding current. This way of controlling the power supplying and/or absorbing device may therefore remove some of any voltage variations in the voltage of the load conductor, whereby voltage variations in the voltage of the load conductor and any harmonics which may be generated by the load in the voltage of the power system can be damped.

Loads such as EAFs may generate not only characteristic harmonics, but may generate (e.g., mostly generate) interharmonics for the relatively low frequencies. Interharmonics are of concern in many applications. By the virtual impedance-based controlling of the power supplying and/or absorbing device as described herein, both characteristic harmonics and interharmonics can be damped.

With the reduction or avoidance of any harmonics that may be generated by the load in the voltage of the power system using such virtual impedance-based controlling of the power supplying and/or absorbing device as described herein, the need for increasing the size of the power supplying and/or absorbing device in order to achieve a desired or required capacity for compensating for harmonics may be reduced or even avoided, and the cost of the power supplying and/or absorbing device—and thereby also the cost of the overall system—may hence be kept relatively low.

Virtual impedance-based controlling of the power supplying and/or absorbing device as described herein may have a response time that is (much) lower than the response time of "traditional" voltage control, i.e., where voltage of the power system is controlled by measuring voltage and regulating the voltage of the power system towards a certain voltage setpoint using a control loop mechanism that employs a controller such as a proportional integral (PI) controller based on the measured voltage. By such virtual impedance-based controlling of the power supplying and/or absorbing device as described herein, the power supplying and/or absorbing device can be considered to act as a synchronous machine and provide stiffness to the power system. The stiffer the power system is, the less impact any change in the load may have on the voltage of the power system.

By the virtual impedance-based controlling of the power supplying and/or absorbing device as described herein, all phases may be controlled independently of each other.

The virtual reactance may for example be a sum of the reactance of the power supplying and/or absorbing device and a selected percentage of the reactance of the power supplying and/or absorbing device. The selected percentage of the reactance of the power supplying and/or absorbing device, which may be referred to as a margin, may for example being in a range between 1% and 50% of the reactance of the power supplying and/or absorbing device.

Generally, it may be desired for the virtual reactance to be as small as possible. For example, the virtual reactance may be such that, by the determined voltage reference value for the power supplying and/or absorbing device, the power supplying and/or absorbing device is capable of supplying power to the load conductor or absorbing power from the load conductor so as to keep any fluctuations in voltage of the load conductor, compared to an average voltage level of the voltage of the load conductor, over a period of time below a selected threshold voltage fluctuation level while at the same time keeping the virtual reactance as small as possible. Preferably, the selected percentage of the reactance of the power supplying and/or absorbing device may for example be in a range between 1% and 20%, more preferably between 1% and 10%, of the reactance of the power supplying and/or absorbing device.

The virtual resistance may for example be such that a value of the virtual resistance is between 25% and 75%, preferably between 35% and 65%, more preferably between 45% and 55%, for example 50% or about 50%, of the value of the virtual reactance. The virtual resistance may govern the extent to and speed by which transients are damped after occurrence of a disturbance in the power system. The virtual resistance may provide damping for approaching or reaching steady-state conditions after occurrence of a disturbance in the power system. Selection of the value of the virtual resistance may depend on characteristics of the load and possibly on any reactive power compensation device(s)

other than the power supplying and/or absorbing device, such as harmonic filters, which may be included in the apparatus. A less damped load may require a higher virtual resistance.

As indicated in the foregoing, the load may for example include an EAF (or an EAF facility). However, the load is not limited thereto, and could in alternative or in addition to an EAF (facility) include another or other types of loads which may be prone to generate low-order harmonics (e.g., below $5^{th}$ order harmonics) in the voltage of the power system or electrical network feeding the load. The load could for example include a cycloconverter or some type of relatively large electrical machine.

There may be several loads connected with the power system. Each of the loads may be connected or connectable to the load conductor.

The load conductor may for example comprise a bus, or busbar. The power system may for example comprise a power transmission and/or distribution system. The power system may for example comprise a power grid, e.g., a power transmission and/or distribution grid.

The voltage reference value may be determined by multiplying the sensed voltage of the load conductor with the virtual impedance. Controlling of the power supplying and/or absorbing device to supply power to the load conductor or absorb power from the load conductor based on the determined voltage reference value may comprise regulating or controlling the voltage output by the power supplying and/or absorbing device such that the output voltage conforms with, or comes closer to conforming with, the voltage reference value, e.g., by means of comparison of the voltage of the load conductor with the voltage reference value.

The virtual impedance of the power supplying and/or absorbing device is associated with a virtual reactance and a virtual resistance, e.g., as components of the virtual impedance.

The power supplying and/or absorbing device may be configured to have a selected or predefined virtual impedance, in such a way that a value of the virtual reactance is higher than the value of a reactance of the power supplying and/or absorbing device and a value of the virtual resistance is less than the value of the virtual reactance.

The reactance of the power supplying and/or absorbing device may be constituted by the "physical" reactance of the power supplying and/or absorbing device. In other words, the reactance of the power supplying and/or absorbing device may be the reactance of the power supplying and/or absorbing device resulting from the reactance of individual elements or components of the power supplying and/or absorbing device.

As mentioned, the control unit is configured to obtain at least one value indicative of voltage of the load conductor. The at least one value indicative of voltage of the load conductor may for example be or have been measured or sensed by at least one sensor such as at least one voltage transducer. The control unit may be connected with the at least one sensor in order to obtain the (at least one value indicative of the) voltage of the load conductor. Such at least one sensor may be part of the apparatus, which hence may include such at least one sensor.

In addition to the virtual impedance-based controlling of the power supplying and/or absorbing device as described herein, a flicker control algorithm or method may be implemented, e.g., in the control unit. To that end, the control unit may be configured to obtain a plurality of values indicative of current of the load at different time instants during a period of time, and determine a change in current of the load over the period of time based on the plurality of values indicative of current of the load at the different time instants. The plurality of values indicative of current of the load at different time instants during a period of time may for example be or have been measured or sensed by at least one sensor such as at least one current transducer. The control unit may be connected with the at least one sensor in order to obtain the plurality of values (indicative) of current of the load at the different time instants. Such at least one sensor may be part of the apparatus, which hence may include such at least one sensor. The control unit may be configured to determine the voltage reference value for the power supplying and/or absorbing device further based on the determined change in current of the load over the period of time. The control unit may be configured to determine the voltage reference value for the power supplying and/or absorbing device based on the plurality of values indicative of current of the load at the different time instants to decrease any fluctuations in the current of the load, compared to an average current level of the current of the load, over a period of time. By such configuration, the power supplying and/or absorbing device may counteract any rapid changes in the load current (which may be referred to as flicker as mentioned in the foregoing). This may be done in addition to damping any voltage variations in the voltage of the load conductor and any harmonics which may be generated by the load in the voltage of the power system, by means of the virtual impedance-based controlling of the power supplying and/or absorbing device as described herein.

In some cases or applications, it may be difficult or even impossible to obtain (values indicative of) the current of the load. For example, it may for some reasons be difficult or even impossible to sense or measure the current of the load. Further, as mentioned, there may be several loads connected with the power system, where each of the loads may be connected or connectable to the load conductor. However, it may for some reasons be difficult or even impossible to sense or measure the current of one or more of the loads. For example, it may only be possible to sense or measure the current of one of the loads, but not of the other loads. In such cases, it may be difficult or even impossible to establish a load current to be used in a flicker control algorithm or method. However, in such cases the virtual impedance-based controlling of the power supplying and/or absorbing device as described herein may still be used.

Also, use of the virtual impedance-based controlling of the power supplying and/or absorbing device as described herein may facilitate or allow for relaxing the requirements on any current sensing devices, which for example may be installed in a feeder connecting the load (e.g., an EAF) with another or other components such as an electrical substation, and which may be configured to sense current of the load. Such current sensing devices may for example include current transformers, which may saturate when DC current is generated by a load such as an EAF. In such cases the virtual impedance-based controlling of the power supplying and/or absorbing device as described herein may however still be used.

In addition to the virtual impedance-based controlling of the power supplying and/or absorbing device as described herein (and possibly the flicker control as described herein), a power factor control algorithm or method may be implemented, e.g., in the control unit. To that end, the control unit may be configured to obtain at least one value indicative of current of the power system and determine the voltage reference value for the power supplying and/or absorbing device further based on the at least one value indicative of current of the power system. The control unit may be configured to determine the voltage reference value for the power supplying and/or absorbing device based on the least one value indicative of current of the power system and the at least one value indicative of voltage of the load conductor to increase the power factor of the load.

The (at least one value indicative of the) current of the power system may be determined directly, e.g., by measuring or sensing the current of the power system, e.g., using a current transducer connected to the power system, or indirectly. The (at least one value indicative of the) current of the power system may be determined indirectly for example based on measuring or sensing current of the power supplying and/or absorbing device and current of the load, e.g., using one or more current transducers connected to the power supplying and/or absorbing device and/or to the load. The control unit may be connected with such one or more current transducers in order to obtain at least one value indicative of current of the power system.

The power supplying and/or absorbing device may for example be based on a Voltage Source Converter (VSC) based device, a Static Synchronous Compensator (STATCOM) and/or a multi-level converter. The STATCOM may have a delta topology. However, the STATCOM is not limited thereto, and could in alternative have, e.g., a wye topology. The multi-level converter may for example comprise a three-level converter.

As mentioned in the foregoing, the power supplying and/or absorbing device may be directly connected to the load conductor. However, in another or other example implementations, the power supplying and/or absorbing device could be indirectly connected to the load conductor (i.e., via one or more intermediate components).

According to a third aspect of the present invention, a computer program is provided. The computer program comprises instructions, which when executed by one or more processors comprised in a control unit, cause the control unit to perform a method according to the second aspect of the present invention.

According to a fourth aspect of the present invention, a processor-readable medium is provided. The processor-readable medium has a computer program loaded thereon, wherein the computer program comprises instructions, which, when executed by one or more processors comprised in or constituting a control unit, cause the control unit to perform a method according to the second aspect of the present invention.

According to a fifth aspect of the present invention, a system is provided. The system comprises a power system, a load connected with the power system, and a load conductor. The load is connected or connectable to the load conductor. The system comprises an apparatus according to the first aspect of the present invention, configured to supply power to the load or absorb power from the load.

The control unit may for example include or be constituted by any suitable central processing unit (CPU), microcontroller, digital signal processor (DSP), Application Specific Integrated Circuit (ASIC), Field Programmable Gate Array (FPGA), etc., or any combination thereof. The control unit may optionally be capable of executing software instructions stored in a computer program product, e.g., in the form of a memory. The memory may for example be any combination of read and write memory (RAM) and read only memory (ROM). The memory may comprise persistent storage, which for example can be a magnetic memory, an optical memory, a solid-state memory or a remotely mounted memory, or any combination thereof.

Each or any of the one or more processors may for example comprise a CPU, a microcontroller, a DSP, an ASIC, an FPGA, etc., or any combination thereof.

The processor-readable medium may for example include a Digital Versatile Disc (DVD) or a floppy disk or any other suitable type of processor-readable means or processor-readable (digital) medium, such as, but not limited to, a memory such as, for example, nonvolatile memory, a hard disk drive, a Compact Disc (CD), a Flash memory, magnetic tape, a Universal Serial Bus (USB) memory device, a Zip drive, etc.

Further objects and advantages of the present invention are described in the following by means of exemplifying embodiments. It is noted that the present invention relates to all possible combinations of features recited in the claims. Further features of, and advantages with, the present invention will become apparent when studying the appended claims and the description herein. Those skilled in the art realize that different features of the present invention can be combined to create embodiments other than those described herein.

BRIEF DESCRIPTION OF THE DRAWINGS

Exemplifying embodiments of the present invention will be described below with reference to the accompanying drawings.

All the figures are schematic, not necessarily to scale, and generally only show parts which are necessary in order to elucidate embodiments of the present invention, wherein other parts may be omitted or merely suggested.

DESCRIPTION WITH REFERENCE TO THE DRAWINGS

The present invention will now be described hereinafter with reference to the accompanying drawings, in which exemplifying embodiments of the present invention are shown. The present invention may, however, be embodied in many different forms and should not be construed as limited to the embodiments of the present invention set forth herein; rather, these embodiments are provided by way of example so that this disclosure will convey the scope of the present invention to those skilled in the art.

Figure 1:
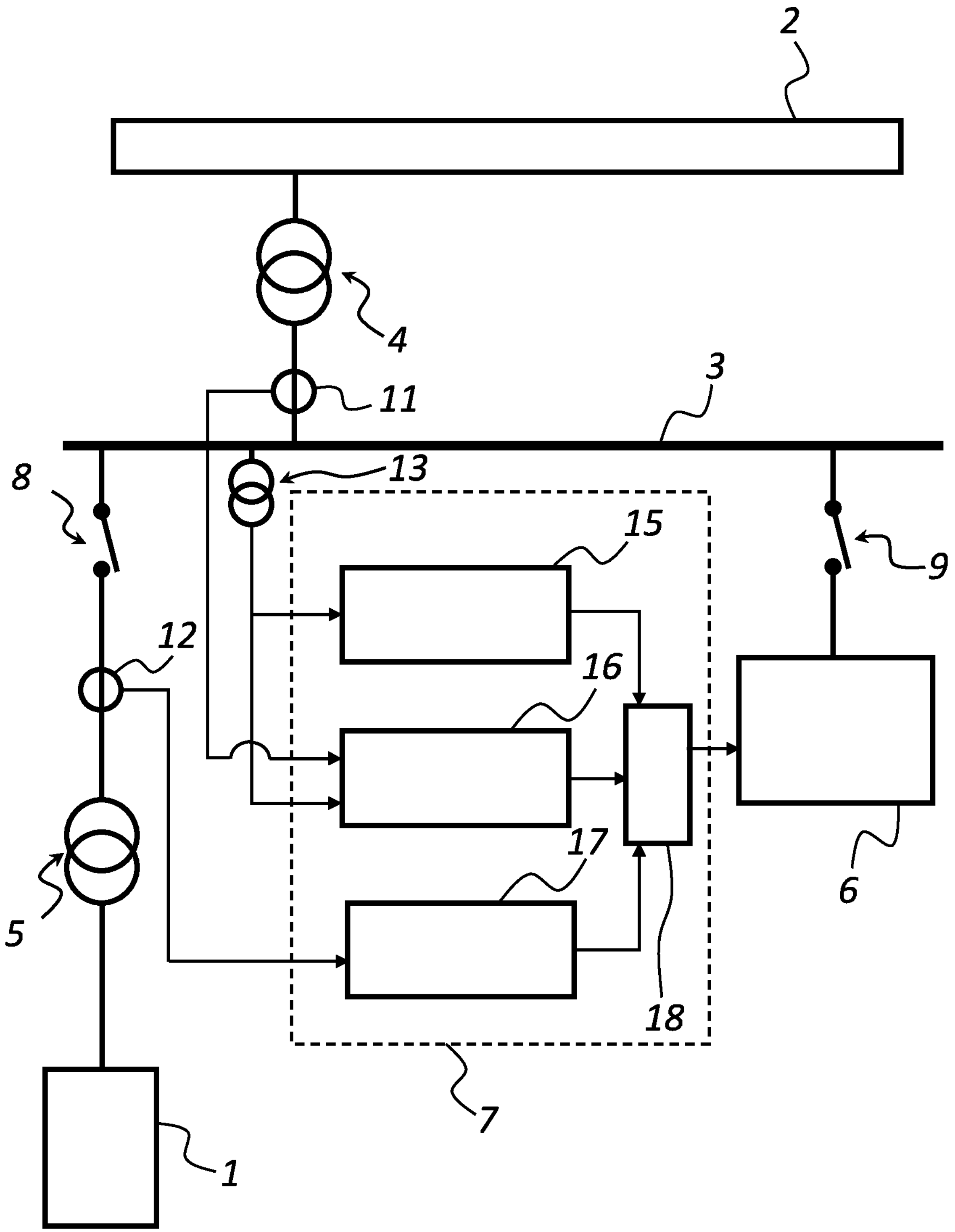
FIG. 1 is a schematic view of a system according to an embodiment of the present invention.

FIG. 1 is a schematic view of a system according to an embodiment of the present invention, which system comprises an apparatus according to an embodiment of the present invention.

In accordance with the embodiment of the present invention illustrated in FIG. 1, the system comprises a power system 2, a transformer 4, a load 1 that is connected with the power system 2, and a load conductor 3. The load 1 is connected or connectable to the load conductor 3, possibly via a transformer 5. The transformer 5, which may be referred to as a load transformer, may be omitted. The power system 2 is connected or connectable to the load conductor 3 via the transformer 4. The load conductor 3 may for example comprise a bus, or busbar. The power system 2 may for example comprise a power transmission and/or distribution system. The power system 2 may for example comprise a power grid, e.g., a power transmission and/or distribution grid. The load 1 may for example include an electrical arc furnace (EAF) but is not limited thereto. The transformer 4 is connected between the power system 2 and the load 1, and as such the transformer 4 could, according to one or more embodiments of the present invention, be referred to (or comprising) as a step-down transformer. The transformer 4 may be omitted.

As illustrated in FIG. 1, the load 1 may be connectable to the load conductor 3 by means of a switch 8, which may be normally closed (e.g., so that the switch 8 conducts current therethrough) when or whenever the load 1 is in operation.

The system comprises an apparatus that is configured to supply power to the load 1 connected with the power system 2 or absorb power from the load 1. The apparatus may be configured to supply power to the load 1, e.g., in addition to any power supplied to the load 1 from the power system 2.

The apparatus comprises a power supplying and/or absorbing device 6. The power supplying and/or absorbing device 6 is connected to the load conductor 3 and is configured for selectively supplying power to the load conductor 3 or absorbing power from the load conductor 3. The power supplied to the load conductor 3 or absorbed from the load conductor 3 by the power supplying and/or absorbing device 6 is governed at least by a voltage reference value of the power supplying and/or absorbing device 6.

The apparatus comprises a control unit 7. The control unit 7 is configured to control operation of the power supplying and/or absorbing device 7. The apparatus, comprising the power supplying and/or absorbing device 6 and the control unit 7, is configured to supply power to the load 1 or absorb power from the load 1.

The power supplying and/or absorbing device 6 may for example be based on a Voltage Source Converter (VSC) based device, a Static Synchronous Compensator (STATCOM) and/or a multi-level converter. The STATCOM may for example have a delta topology. However, the STATCOM is not limited thereto, and could in alternative have, e.g., a wye topology. The multi-level converter may for example comprise a three-level converter.

For example, in case the power supplying and/or absorbing device 6 is based on a STATCOM having a delta topology, the power supplying and/or absorbing device 6 may be connected to the load conductor 3 at, or via a conductor connected to, a corner point (e.g., terminal) of the delta topology-configured STATCOM.

The power supplying and/or absorbing device 6 may be directly connected to the load conductor 3, as illustrated in FIG. 1, or may be indirectly connected to the load conductor 3 (e.g., via one or more intermediate devices or components).

The control unit 7 is configured to obtain at least one value indicative of voltage of the load conductor 3, and determine, based on the at least one value indicative of voltage of the load conductor 3 and a virtual impedance of the power supplying and/or absorbing device 6, a voltage reference value for the power supplying and/or absorbing device 6. The control unit 7 is configured to control the power supplying and/or absorbing device to supply power to the load conductor 3, and thereby supply power to the load 1, or absorb power from the load conductor 3, and thereby absorb power from the load 1, based on the determined voltage reference value. The virtual impedance of the power supplying and/or absorbing device 6 is associated with a virtual reactance and a virtual resistance, e.g., as components of the virtual impedance. The power supplying and/or absorbing device is (or has been) configured such that a value of the virtual reactance is higher than the value of a reactance of the power supplying and/or absorbing device 6, and such that a value of the virtual resistance is less than the value of the virtual reactance.

The reactance of the power supplying and/or absorbing device 6 may be the "physical" reactance of the power supplying and/or absorbing device 6. In other words, the reactance of the power supplying and/or absorbing device may be the reactance of the power supplying and/or absorbing device 6 resulting from the reactance of individual elements or components of the power supplying and/or absorbing device 6. For example, a delta topology-configured STATCOM may comprise three converter arms wherein each converter arm may include a plurality of converter cells connected in series with a reactor and possibly also another or other components. In case the power supplying and/or absorbing device 6 is based on a STATCOM having a delta topology, the reactors in the respective one of the converter arms may define at least in part the reactance of the power supplying and/or absorbing device 6. Similarly, in case the power supplying and/or absorbing device 6 would be based on a STATCOM having a topology other than delta topology, any reactors in the respective one of a plurality of converter arms of the STATCOM may define at least in part the reactance of the power supplying and/or absorbing device 6.

In case the power supplying and/or absorbing device 6 would be out of service it may be disconnected from the load conductor 3 by means of a switch 9, which may be normally closed (e.g., so that the switch 9 conducts current therethrough) when or whenever the power supplying and/or absorbing device 6 is in service.

The at least one value indicative of voltage of the load conductor 3 may for example be or have been measured or sensed by at least one sensor such as at least one voltage transducer. In accordance with the embodiment of the present invention illustrated in FIG. 1, a sensor 13, including a potential transformer, is provided for sensing voltage of the load conductor 3. As illustrated in FIG. 1, the control unit 7 may be connected with the sensor 13 in order to obtain the (at least one value indicative of the) voltage of the load conductor 3. The sensor 13 may be part of the apparatus, which hence may include the sensor 13.

In accordance with the embodiment of the present invention illustrated in FIG. 1, the control unit 7 includes first, second, third and fourth sub-units 15 to 18, respectively.

The first sub-unit 15 takes as input the (at least one value indicative of the) voltage of the load conductor 3, which in accordance with the embodiment of the present invention illustrated in FIG. 1 is provided by the sensor 13. Thus, the first sub-unit 15 may obtain the (at least one value indicative of the) voltage of the load conductor 3 from the sensor 13. The first sub-unit 15 implements the virtual impedance-based controlling of the power supplying and/or absorbing device 6 as described in the foregoing in this section of the description and elsewhere herein. The first sub-unit 15 is configured to determine, based on the (at least one value indicative of the) voltage of the load conductor 3 and the virtual impedance of the power supplying and/or absorbing device 6, a first voltage reference value for the power supplying and/or absorbing device 6. The output from the first sub-unit 15 is the first voltage reference value, which is transmitted to the fourth sub-unit 18. The first voltage reference value may have a component corresponding to active power and a component corresponding to reactive power.

The second sub-unit 16 takes as inputs at least one value indicative of current of the power system 2 and the (at least one value indicative of the) voltage of the load conductor 3.

As for the first sub-unit 15, the (at least one value indicative of the) voltage of the load conductor 3 is, in accordance with the embodiment of the present invention illustrated in FIG. 1, provided by the sensor 13. Further in accordance with the embodiment of the present invention illustrated in FIG. 1, the at least one value indicative of current of the power system 2 is provided by a sensor 11, which for example may include a current transducer, which as illustrated in FIG. 1 may be connected to the power system 2. Thus, the (at least one value indicative of the) current of the power system 2 may be determined directly. It could be determined indirectly for example based on measuring or sensing current of the power supplying and/or absorbing device 6 and current of the load 1. As illustrated in FIG. 1, the control unit 7 may be connected with the sensor 11 in order to obtain the (at least one value indicative of the) current of the power system 2. The sensor 11 may be part of the apparatus, which hence may include the sensor 11. Thus, the second sub-unit 16 obtains the (at least one value indicative of the) current of the power system 2 from the sensor 11 and the (at least one value indicative of the) voltage of the load conductor 3 from the sensor 13. The second sub-unit 16 is configured to determine a second voltage reference value for the power supplying and/or absorbing device 6 based on the (at least one value indicative of the) current of the power system 2 and the (at least one value indicative of the) voltage of the load conductor 3 to increase the power factor of the load 1. The output from the second sub-unit 16 is the second voltage reference value, which is transmitted to the fourth sub-unit 18. The second voltage reference value may have (e.g., only have) a component corresponding to reactive power. In this way, the second sub-unit 16 may implement a power factor control algorithm or method.

The third sub-unit 17 takes as input a plurality of values indicative of current of the load 1 at different time instants during a period of time. In accordance with the embodiment of the present invention illustrated in FIG. 1, the plurality of values indicative of current of the load 1 at different time instants during a period of time are provided by a sensor 12, which for example may include a current transducer, which as illustrated in FIG. 1 may be connected to the load 1. As illustrated in FIG. 1, the control unit 7 may be connected with the sensor 12 in order to obtain the plurality of values indicative of current of the load 1 at different time instants during a period of time. The sensor 12 may be part of the apparatus, which hence may include the sensor 12. Thus, the third sub-unit 17 obtains plurality of values indicative of current of the load 1 at different time instants during a period of time from the sensor 12. The third sub-unit 17 is configured to determine a change in current of the load 1 over the period of time based on the plurality of values indicative of current of the load 1 at the different time instants, and to determine a third voltage reference value for the power supplying and/or absorbing device 6 based on the determined change in current of the load 1 over the period of time to decrease any fluctuations in the current of the load 1, compared to an average current level of the current of the load 1, over a period of time. The output from the third sub-unit 17 is the third voltage reference value, which is transmitted to the fourth sub-unit 18. The third voltage reference value may have a component corresponding to active power and a component corresponding to reactive power. In this way, the third sub-unit 17 may implement a flicker control algorithm or method.

In the fourth sub-unit 18, the respective outputs from the first sub-unit 15, the second sub-unit 16 and the third sub-unit 17 may be combined (e.g., summed) into a voltage reference value for the power supplying and/or absorbing device 6. The output from the fourth sub-unit 18—i.e., the voltage reference value for the power supplying and/or absorbing device 6—is transmitted to the power supplying and/or absorbing device 6 as illustrated in FIG. 1.

It is to be understood that each of the second sub-unit 16 and the third sub-unit 17 is optional, and that one or both of the second sub-unit 16 and the third sub-unit 17 may be omitted. In case both of the second sub-unit 16 and the third sub-unit 17 are omitted, the fourth sub-unit 18 may also be omitted, wherein the output from sub-unit 15 may be transmitted directly to the power supplying and/or absorbing device 6 and not to the fourth sub-unit 18 as illustrated in FIG. 1. In other words, in that case, the first voltage reference value output the by the first sub-unit 15 may constitute the voltage reference value for the power supplying and/or absorbing device 6 that is transmitted to the power supplying and/or absorbing device 6 as illustrated in FIG. 1.

In case the third sub-unit 17 is omitted but not the second sub-unit 16, the outputs from the first sub-unit 15 and the second sub-unit 16 may be transmitted to the fourth sub-unit 18 in which they may be combined into a voltage reference value for the power supplying and/or absorbing device 6. The output from the fourth sub-unit 18—i.e., the voltage reference value for the power supplying and/or absorbing device 6—is transmitted to the power supplying and/or absorbing device 6. In this case, the sensor 12 may be omitted. In case the second sub-unit 16 is omitted but not the third sub-unit 17, the outputs from the first sub-unit 15 and the third sub-unit 17 may be transmitted to the fourth sub-unit 18 in which they may be combined into a voltage reference value for the power supplying and/or absorbing device 6. The output from the fourth sub-unit 18—i.e., the voltage reference value for the power supplying and/or absorbing device 6—is transmitted to the power supplying and/or absorbing device 6. In this case, the sensor 11 may be omitted.

It is to be understood that the control unit 7, including the first to fourth sub-units 15 to 18, may be implemented in hardware and/or software. Each or any of the first to fourth sub-units 15 to 18 may be implemented in hardware and/or software.

Figure 2:
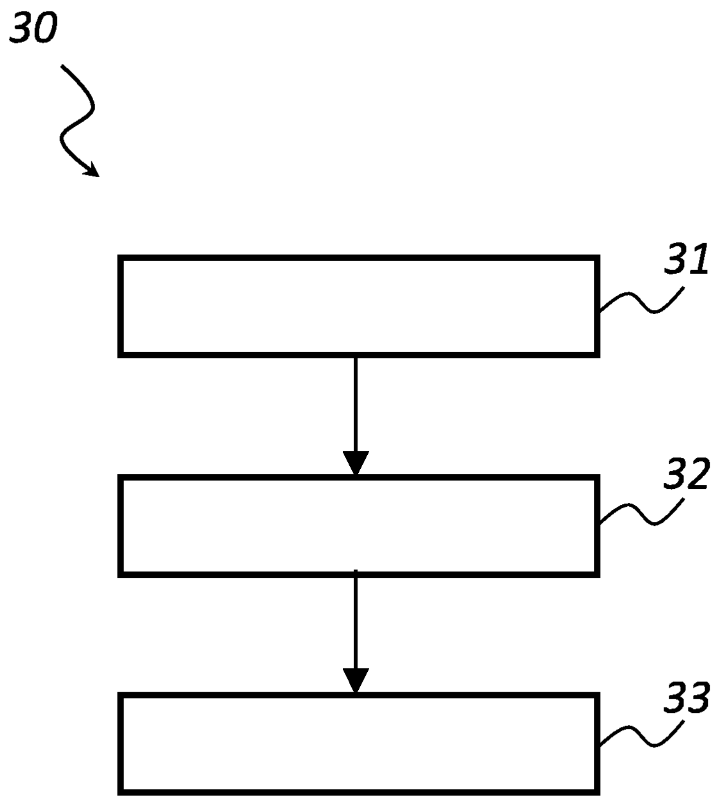
FIG. 2 is a schematic flowchart of a method according to an embodiment of the present invention.

FIG. 2 is a schematic flowchart of a method 30 according to an embodiment of the present invention. The method 30 is implemented in an apparatus configured to supply power to a load connected with a power system or absorb power from the load. The load is connected or connectable to a load conductor. The apparatus comprises a power supplying and/or absorbing device. The power supplying and/or absorbing device is connected to the load conductor. The power supplying and/or absorbing device is configured for selectively supplying power to the load conductor or absorbing power from the load conductor. The power supplied to the load conductor or absorbed from the load conductor by the power supplying and/or absorbing device is governed at least by a voltage reference value of the power supplying and/or absorbing device.

The method 30 comprises, at 31, obtaining at least one value indicative of voltage of the load conductor.

At 32 it is determined, based on the at least one value indicative of voltage of the load conductor and a virtual impedance of the power supplying and/or absorbing device, a voltage reference value for the power supplying and/or absorbing device.

At 33, the power supplying and/or absorbing device is controlled to supply power to the load conductor, and thereby supply power to the load, or absorb power from the load conductor, and thereby absorb power from the load, based on the determined voltage reference value.

The virtual impedance of the power supplying and/or absorbing device is associated with a virtual reactance and a virtual resistance, wherein the power supplying and/or absorbing device is configured such that a value of the virtual reactance is higher than the value of a reactance of the power supplying and/or absorbing device, and such that a value of the virtual resistance is less than the value of the virtual reactance.

In conclusion, an apparatus is provided, configured to supply power to a load connected with a power system or absorb power from the load, the load being connected or connectable to a load conductor. The apparatus comprises a power supplying and/or absorbing device, configured for selectively supplying power to the load conductor or absorbing power from the load conductor, and a control unit configured to control the power supplying and/or absorbing device. The control unit is configured to determine, based on at least one value indicative of voltage of the load conductor and a virtual impedance of the power supplying and/or absorbing device, a voltage reference value for the power supplying and/or absorbing device, and control the power supplying and/or absorbing device to supply power to the load conductor, and thereby supply power to the load, or absorb power from the load conductor, and thereby absorb power from the load, based on the determined voltage reference value.

While the present invention has been illustrated in the appended drawings and the foregoing description, such illustration is to be considered illustrative or exemplifying and not restrictive; the present invention is not limited to the disclosed embodiments. Other variations to the disclosed embodiments can be understood and effected by those skilled in the art in practicing the claimed invention, from a study of the drawings, the disclosure, and the appended claims. In the appended claims, the word “comprising” does not exclude other elements or steps, and the indefinite article “a” or “an” does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. An apparatus configured to supply power to a load connected with a power system or absorb power from the load, the load being connected or connectable to a load conductor, the apparatus comprising:

a power supplying and/or absorbing device connected to the load conductor and configured for selectively supplying power to the load conductor or absorbing power from the load conductor, wherein the power supplied to the load conductor or absorbed from the load conductor by the power supplying and/or absorbing device is governed at least by a voltage reference value of the power supplying and/or absorbing device; and a control unit configured to control operation of the power supplying and/or absorbing device, the control unit being further configured to:

obtain at least one value indicative of voltage of the load conductor;

determine, based on the at least one value indicative of voltage of the load conductor and a virtual impedance of the power supplying and/or absorbing device, a voltage reference value for the power supplying and/or absorbing device; and control the power supplying and/or absorbing device to supply power to the load conductor, and thereby supply power to the load, or absorb power from the load conductor, and thereby absorb power from the load, based on the determined voltage reference value;

wherein the virtual impedance of the power supplying and/or absorbing device is associated with a virtual reactance and a virtual resistance, wherein the power supplying and/or absorbing device is configured such that a value of the virtual reactance is higher than the value of a reactance of the power supplying and/or absorbing device, and such that a value of the virtual resistance is less than the value of the virtual reactance.

2. An apparatus according to claim 1, wherein the virtual reactance is a sum of the reactance of the power supplying and/or absorbing device and a selected percentage of the reactance of the power supplying and/or absorbing device, the selected percentage of the reactance of the power supplying and/or absorbing device being in a range between 1% and 50% of the reactance of the power supplying and/or absorbing device.

3. An apparatus according to claim 1, wherein the virtual reactance is such that, by the determined voltage reference value for the power supplying and/or absorbing device, the power supplying and/or absorbing device is capable of supplying power to the load conductor or absorbing power from the load conductor so as to keep any fluctuations in voltage of the load conductor, compared to an average voltage level of the voltage of the load conductor, over a period of time below a selected threshold voltage fluctuation level while at the same time keeping the virtual reactance as small as possible.

4. An apparatus according to claim 1, wherein the virtual resistance is such that a value of the virtual resistance is between 25% and 75% of the value of the virtual reactance.

5. An apparatus according to claim 1, wherein the control unit is further configured to:

obtain a plurality of values indicative of current of the load at different time instants during a period of time;

determine a change in current of the load over the period of time based on the plurality of values indicative of current of the load at the different time instants; and determine the voltage reference value for the power supplying and/or absorbing device further based on the determined change in current of the load over the period of time.

6. An apparatus according to claim 5, wherein the control unit is configured to determine the voltage reference value for the power supplying and/or absorbing device based on the plurality of values indicative of current of the load at the different time instants to decrease any fluctuations in the current of the load, compared to an average current level of the current of the load, over a period of time.

7. An apparatus according to claim 1, wherein the control unit is further configured to obtain at least one value indicative of current of the power system and to determine the voltage reference value for the power supplying and/or absorbing device further based on the least one value indicative of current of the power system.

8. An apparatus according to claim 7, wherein the control unit is configured to determine the voltage reference value for the power supplying and/or absorbing device based on the least one value indicative of current of the power system and the at least one value indicative of voltage of the load conductor to increase the power factor of the load.

9. An apparatus according to claim 1, wherein the power supplying and/or absorbing device is based on a Voltage Source Converter (VSC) based device, a Static Synchronous Compensator (STATCOM), and/or a multi-level converter.

10. An apparatus according to claim 1, wherein the power supplying and/or absorbing device is directly connected to the load conductor.

11. A method implemented in an apparatus configured to supply power to a load connected with a power system or absorb power from the load, the load being connected or connectable to a load conductor, the apparatus comprising a power supplying and/or absorbing device connected to the load conductor and configured for selectively supplying power to the load conductor or absorbing power from the load conductor, wherein the power supplied to the load conductor or absorbed from the load conductor by the power supplying and/or absorbing device is governed at least by a voltage reference value of the power supplying and/or absorbing device, the method comprising:

obtaining at least one value indicative of voltage of the load conductor;

determining, based on the at least one value indicative of voltage of the load conductor and a virtual impedance of the power supplying and/or absorbing device, a voltage reference value for the power supplying and/or absorbing device; and controlling the power supplying and/or absorbing device to supply power to the load conductor, and thereby supply power to the load, or absorb power from the load conductor, and thereby absorb power from the load, based on the determined voltage reference value;

wherein the virtual impedance of the power supplying and/or absorbing device is associated with a virtual reactance and a virtual resistance, wherein the power supplying and/or absorbing device is configured such that a value of the virtual reactance is higher than the value of a reactance of the power supplying and/or absorbing device, and such that a value of the virtual resistance is less than the value of the virtual reactance.

12. A non-transitory computer-readable medium having a computer program comprising instructions stored thereon, wherein the instructions, when executed by one or more processors comprised in a control unit, cause the control unit to perform a method according to claim 11.

13. A system comprising:

a power system;

a load connected with the power system;

a load conductor, wherein the load is connected or connectable to the load conductor; and an apparatus according to claim 1 configured to supply power to the load or absorb power from the load.

* * * * *